United States Patent
Dai et al.

(10) Patent No.: US 8,417,853 B2
(45) Date of Patent: Apr. 9, 2013

(54) UNIVERSAL SERIAL BUS HOST CONTROL METHODS AND UNIVERSAL SERIAL BUS HOST CONTROLLERS

(75) Inventors: Di Dai, Taipei (TW); Jiin Lai, Taipei (TW); Zhiqiang Hui, Taipei (TW); Shanna Pang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 142 days.

(21) Appl. No.: 12/906,431

(22) Filed: Oct. 18, 2010

(65) Prior Publication Data

US 2011/0099305 A1    Apr. 28, 2011

(30) Foreign Application Priority Data

Oct. 23, 2009    (CN) .......................... 2009 1 0207016

(51) Int. Cl.
*G06F 3/00* (2006.01)
*G06F 5/00* (2006.01)

(52) U.S. Cl. ........................................................ 710/52
(58) Field of Classification Search ..................... 710/52
See application file for complete search history.

(56) References Cited

U.S. PATENT DOCUMENTS 7,757,028 B2 *    7/2010    Druke et al. .................. 710/244

* cited by examiner

*Primary Examiner* — Chun-Kuan Lee
(74) *Attorney, Agent, or Firm* — McClure, Qualey & Rodack, LLP

(57) ABSTRACT

A USB host control method is provided for a USB host controller. The USB host controller includes a USB device and a buffer, the USB device includes one or more endpoints. The USB host control method includes the steps of: storing first output data to be sent to a first endpoint into one or more buffer units used for the first endpoint; sending the first output data to the first endpoint; and when a first predetermined response from the first endpoint is received, configuring fake releasing labels and information tags corresponding to the first endpoint in the one or more buffer units, and not releasing the one or more buffer units.

20 Claims, 4 Drawing Sheets

UNIVERSAL SERIAL BUS HOST CONTROL METHODS AND UNIVERSAL SERIAL BUS HOST CONTROLLERS

CROSS REFERENCE TO RELATED APPLICATIONS

This Application claims priority of China Patent Application No. 200910207016.9, filed on Oct. 23, 2009, the entirety of which is incorporated by reference herein.

BACKGROUND OF THE INVENTION

1. Field of the Invention

The invention relates to a downstream cycle/out transaction for a universal serial bus (USB) host controller with 3.0 protocol, and more particularly to a USB host controller with 3.0 protocol and a control method thereof, which can reduce the frequency of accessing a system memory, thereby enhancing the performance of the USB host controller.

2. Description of the Related Art

A universal serial bus (USB) 3.0 protocol has already been established. In the USB 3.0 protocol, an NRDY (unready, or not ready)/ERDY (endpoint ready) mechanism is defined. In particular, a USB host controller is coupled to an external system memory and communicates with at least one USB device. Each USB device comprises one or more endpoints. When the USB host controller sends a request (such as an input (IN) request or an output (OUT) request) to the one or more endpoints, if the endpoint is not ready to send/receive the requested data, the endpoint sends an NRDY response to the USB host controller. When the endpoint is ready to send/receive the requested data, the endpoint sends an ERDY request to the USB host controller, so that the USB host controller re-performs the corresponding transaction which was not previously performed due to the NRDY response.

Traditionally, during the processing operation of the output transaction, a buffer unit in an internal buffer of the USB host controller is assigned to read output data from a system memory, and the output data is written into the assigned buffer unit. Then the USB host controller sends the output data to an endpoint. If the USB host controller receives an NRDY response from the endpoint, the USB host controller releases the assigned buffer unit, so that the stored output data is deleted. Then, when the USB host controller receives an ERDY request from the endpoint, the USB host controller assigns a buffer unit in the buffer again to read output data from the system memory. The output data is stored in the assigned buffer unit temporarily and then sent to the endpoint. Finally, the USB host controller once again releases the assigned buffer unit.

According to the above description, once the USB host controller receives an NRDY response from an endpoint, the USB host controller releases the buffer unit that stores the output data. Then, when the USB host controller receives an ERDY request, output data is requested to be read from the external system memory. Accordingly, the time for the USB host controller to respond to the ERDY request is extended, and the frequency of accessing the system memory is increased, which reduces the performance of the USB host controller.

Thus, it is desired to provide a USB host controller and a control method therefore which can reduce the time for the USB host controller to respond to the ERDY request and reduce the frequency of accessing a system memory, which improves the performance of the USB host controller.

BRIEF SUMMARY OF THE INVENTION

The invention provides a USB host controller and a USB host control method which can reduce the amount of time it takes for the USB host controller to respond to the ERDY request and reduce the times for accessing the system memory, thereby enhancing the performance of the USB host controller.

In one aspect of the invention, an exemplary embodiment of a USB host control method is provided for a USB host controller. The USB host controller comprises a USB device and a buffer, the USB device comprises one or more endpoints. The USB host control method comprises the steps of storing first output data to be sent to a first endpoint into one or more buffer units used for the first endpoint; sending the first output data to the first endpoint; and when a first predetermined response from the first endpoint is received, configuring fake releasing labels and information tags corresponding to the first endpoint in the one or more buffer units, and not releasing the one or more buffer units.

In another aspect of the invention, an exemplary embodiment of a USB host controller is provided. The USB host controller communicates with a USB device which comprises one or more endpoints. The USB host controller comprises a buffer and a control unit. The buffer comprises one or more buffer units for storing output data to be sent to the one or more endpoints. The control unit controls output transaction to the one or more endpoints. The control unit sends the first output data to a first endpoint. When a first predetermined response from the first endpoint is received, fake releasing labels and information tags corresponding to the first endpoint are configured in the buffer units storing the first output data of the first endpoint in the buffer, and the buffer units storing the first output data of the first endpoint are not released.

In the exemplary embodiments of the USB host control method and the USB host controller, when an NRDY response from one endpoint is received, a fake releasing label is configured in a buffer unit storing output data rather than that the buffer unit is released. Accordingly, when the endpoint sends an ERDY request, the output data stored in the buffer unit is sent to the endpoint without access to the system memory as the prior art. Thus, the amount of time it takes for the USB host controller to respond to the ERDY request, and the times for accessing the system memory are reduced, thereby enhancing the performance of the USB host controller.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
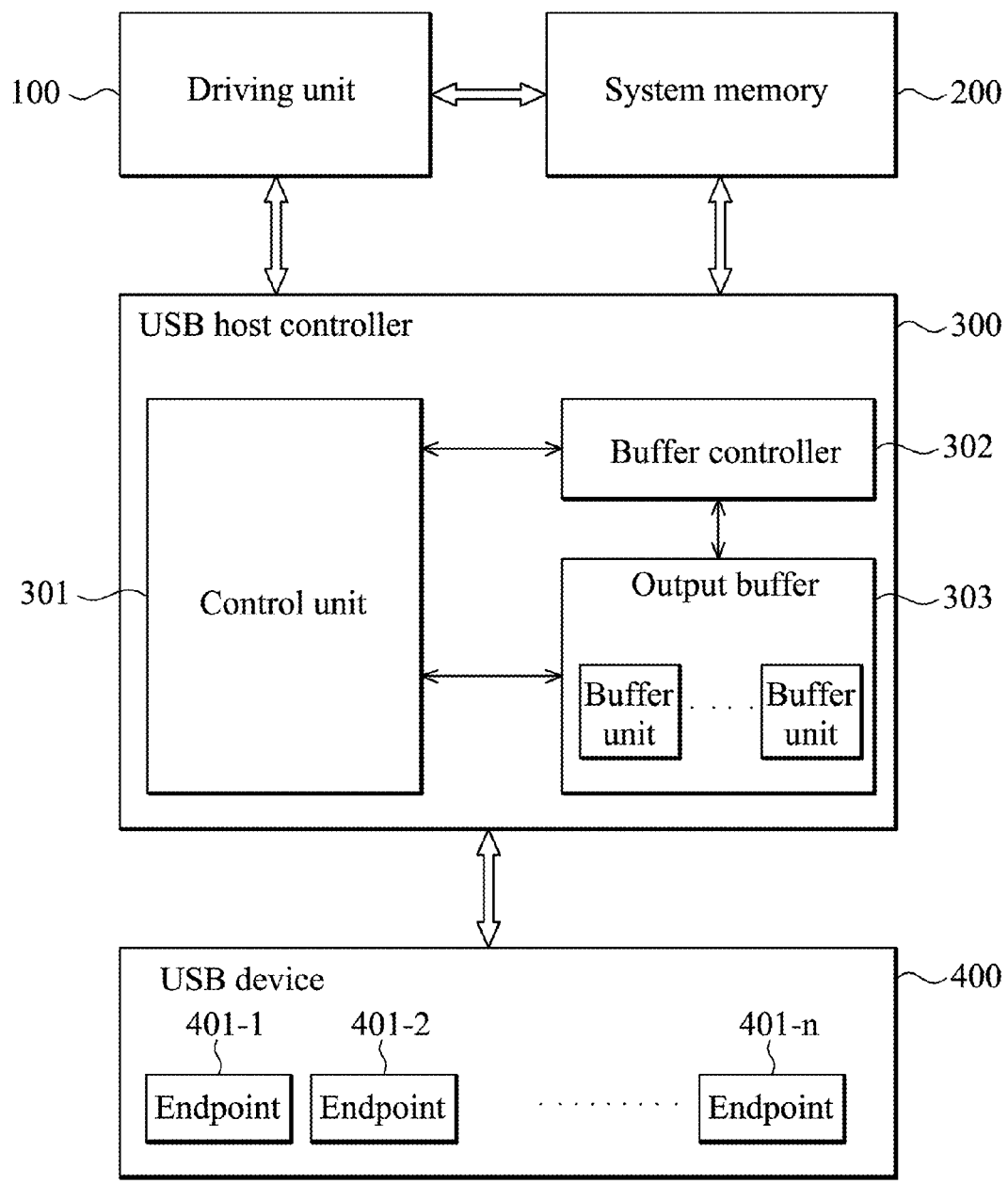
FIG. 1 shows an exemplary embodiment of a USB host controller.

The following description is of the best-contemplated mode of carrying out the invention. This description is made for the purpose of illustrating the general principles of the invention and should not be taken in a limiting sense. The scope of the invention is best determined by reference to the appended claims.

Firstly, the general principles of the invention are described.

In a simple case, when data output transaction for an endpoint is performed, output data, which is read from a system memory and sent to an endpoint, is stored in a buffer unit temporarily. If an NRDY response from the endpoint is received, the buffer unit is labeled as a fake releasing buffer unit, but the buffer unit is not released; that is the output data stored in the buffer unit is not deleted. Moreover, a tag which comprises information related to the endpoint is disposed in the buffer unit. When an ERDY request from a certain endpoint is received later, endpoint information in the ERDY request is compared with the tags disposed in the fake releasing buffer units in the output buffer to check whether there is a fake releasing buffer unit which matches the certain endpoint. If there is a fake releasing buffer unit which matches the certain endpoint, data in the matched fake releasing buffer unit is sent to the certain endpoint, and then the matched fake releasing buffer unit is released; that is the stored output data is deleted. Otherwise, a buffer unit in the output buffer is assigned for the certain endpoint, and the corresponding output data is read from the system memory and stored in the assigned buffer unit. The output data is then sent to the certain endpoint from the assigned buffer unit.

In a complex case, assume that output data to be sent to an endpoint is stored in a plurality of buffer units. When an NRDY response from the endpoint is received, the plurality of buffer units are all labeled as fake releasing buffer units and ranked by sequence numbers according to the sending sequence of the output data. When an ERDY request from the endpoint is later received, the data in the fake releasing buffer units are sent to the endpoint from the lowest sequence number to the highest sequence number. Moreover, when transaction of a certain endpoint is processed, if a buffer unit needs to be assigned for the certain endpoint, buffer units which are not labeled as fake release buffer units have priority for assignment. If the size of the buffer units which are not labeled as fake release buffers is not large enough, the fake release buffers for any other endpoints are assigned for the certain endpoint from the highest sequence number to the lowest sequence number.

In the following description, a universal serial bus (USB) host controller and a control method therefore will be described with reference to drawings. In the drawings, the same elements are labeled with the same reference symbols.

FIG. 1 shows an exemplary embodiment of a USB host controller. Note that the USB host controller shown in FIG. 1 is only part of a USB host controller based on the USB 3.0 protocol, which is related to the concept of the invention.

As shown in FIG. 1, a USB host controller 300 is coupled to a driving unit 100 and a system memory 200 and communicates with a USB device 400 through a USB bus. The USB device 400 comprises one or more endpoints 401-1, 401-2 . . . 401-3. Note that one or more USB devices communicate with the USB host controller 300, and since they have the same structures and the same operations, FIG. 2 shows only one USB device 400 for clarity.

The driving unit 100 is used for driving the USB host controller. When output transaction is determined to be performed, the driving unit 100 informs the USB host controller 300 to send data to an endpoint in the USB device 400 and store the data in the system memory 200. The driving unit 100 can be implemented by hardware, software or a combination of hardware and software. In a preferred embodiment, the driving unit 100 is implemented by software, such as an operation system.

The system memory 200 is located outside of the USB host controller 300 and used to store the output data to be sent to the endpoint in the USB device 400.

The USB host controller 300 comprises a control unit 301, a buffer controller 302, and an output buffer 303.

The output buffer 303 can be divided into several buffer units with a predetermined size. A tag is configured in each buffer unit. The tag of each buffer unit comprises several flag bits, such as a valid bit (VALID), fake release identification (DTRDY), a device address, a device context index (DCI), and a sequence number (SEQ). The width and significance of the flag bits in each tag are shown in Table 1.

TABLE 1

| Tag bits | Width (bit) | Description | Comment |
| --- | --- | --- | --- |
| Valid Bit (VALID) | 1 | Value "0" represents that the buffer unit is being used. Value "1" represents that the buffer unit is free. | |
| Fake Release Identification (DTRDY) | 1 | Value "0" represents that the buffer unit does not contain data. Value "1" represents that the buffer unit contains data and is used as a fake releasing buffer unit. | When VALID is "0", DTRDY is significant. When VALID is "1", DTRDY is automatically reset to "0". When the buffer unit is labeled as a fake releasing buffer unit, DTRDY is set to "1". |
| Device Address | 8 | Represents the address of the USB device corresponding to the data stored in the buffer unit. | When DTRDY is "1", the device address is significant. |
| Device Context Index (DCI) | 4 | For identifying the endpoint in the USB device corresponding to the data stored in the buffer unit. | When DTRDY is "1", DCI is significant. |
| Sequence Number (SEQ) | 4 | Represents the sequence number in the sending sequence of the data stored in the buffer unit. When DCIs in the tags of several fake releasing buffer units are the same, the fake releasing buffer units are ranked from the lowest number to the highest number according to the sequence of sending the data. | When DTRDY is "1", SEQ is significant. |

Note that the width and the values in the above flag bits in Table 1 are examples and without limitation.

The control unit 301 controls the whole operation of the USB host controller 300.

There are generally two reasons why the USB host controller 300 performs a downstream cycle/out transaction. One reason is that when the driving unit 100 informs the USB host controller 300 to output data to a certain endpoint in the USB device 400 (for description purposes, the endpoint 401-1 is given as an example), the control unit 301 allocates the transaction related to the endpoints (including the data outputting transaction to the endpoint 401-1 and the transaction for the other endpoints) to determine the sequence of performing the data outputting transaction and perform data outputting operations to the endpoint 401-1 according to the sequence. The other reason is that when the control unit 301 receives an ERDY request from a certain endpoint in the USB device 400 (the endpoint 401-1 is given as an example), the control unit 301 allocates the transaction related to the endpoints (including the processing operation of the ERDY request, data outputting transaction to the endpoint 401-1, and the transaction for the other endpoints) to determine the sequence of processing the ERDY request and process the EDRY request from the endpoint 401-1 according to the sequence.

No matter what the reason for performing the downstream cycle/out transaction is, when the allocating operation is coming, the control unit 301 sends buffer unit assignation requests to the buffer unit controller 302. Then, the buffer unit controller 302 determines whether there are buffer units having the tags corresponding to the endpoint 401-1 among the fake releasing buffer units in the output buffer 303. Accordingly, the buffer unit controller 302 compares the device addresses of the USB device 400 contained in the assignation request and DCIs of the endpoint 401-1 respectively with the flag bits "Device Address" and "Device Context Index (DCI)" of the fake releasing buffer units to determine whether they are matched.

Note that in the case of the driving unit 100 informs the USB host controller 300 to send output data to the endpoint 401-1, since the output data is sent to the endpoint 401-1 for the first time, there is no fake releasing buffer unit which is labeled due to an NRDY response in the output buffer 303. Thus, there is also no buffer unit having the tag corresponding to the endpoint 401-1. Only when the control unit 301 receives an ERDY request, since the endpoint sends the NRDY response previously, it is possible that there is a fake releasing buffer unit having the tag corresponding the endpoint in the output buffer 303, and the data stored in the fake releasing buffer unit is the output data requested by the ERDY request. Thus, when it is confirmed that there is a fake releasing buffer unit having the tag corresponding to the endpoint 401-1, the control unit 301 sends the data stored in the fake releasing buffer unit to the endpoint 401-1 according to the sending sequence.

Moreover, if there is no buffer unit having the tag corresponding to the endpoint 401-1 among the fake releasing buffer units, the buffer controller 302 determines whether there are free buffer units which are not labeled as fake releasing buffer units in the output buffer 303 (that is the buffer units with flag bits "Valid Bit (VALID)" are "1"). If there are free buffer units, the buffer controller 302 assigns a buffer unit in the output buffer 303 to temporarily store the output data corresponding to the endpoint 401-1. Since the size of each buffer unit is fixed, if there is a large quantity of output data, several buffer units are required to store the output data. In this case, the control unit 301 sends buffer unit assignation requests with a number corresponding to the quantity of output data, so that the buffer controller 302 assigns one buffer unit in response to one buffer unit assignation request and, finally, assigns the buffer units with the number corresponding to the quantity of output data. The flag bit "Valid Bit (VALID)" of each assigned buffer unit is set to "0" and reset to "1" after the assigned buffer unit is released.

After the buffer controller 302 assigns the buffer unit, the control unit 301 performs control operations, so that the output data sent to the endpoint 401-1 is read from the system memory 200 according to the sending sequence and then stored into the assigned buffer unit. Then, the output data is sent to the endpoint 401-1 according to the sending sequence.

On the contrary, if there are no free buffer units in the output buffer 303, meaning that all the buffer units in the output buffer 303 are labeled as fake releasing buffer units and have the tags corresponding to other endpoints, the buffer controller 302 ignores the tags configured in the buffer units and selects one or more buffer units being used for a certain endpoint among the buffer units. Then, the buffer controller 302 assigns the buffer unit having the highest sequence number among the one or more buffer units to the endpoint 401-1. Moreover, the control unit 301 modifies the flag bit "Fake Release Identification (DTRDY)" of the assigned buffer unit to "0", so that the flag bits "Device Address", "Device Context Index (DCI)", and "Sequence Number (SEQ)" configured in the assigned buffer unit are no longer valid. Then, the control unit 301 reads the output data to be sent to the endpoint 401-1 from the system memory 200 according to the sending sequence and stores it into the assigned buffer unit. Finally, the output data is sent to the endpoint 401-1 according to the sending sequence.

After the output data is sent to the endpoint 401-1, the control unit 301 receives a response from the endpoint. If an acknowledgment (ACK) response is received, the control unit 301 releases the assigned buffer unit. When there is still other data to be sent, the above process is repeated until all data to be sent is transferred. If the control unit 301 receives a stall (STALL) response, meaning that there is an error, the control unit 301 performs other processes related to the stall response. In this case, the processes performed by the control unit 301 are the same as the processes performed by a conventional USB host controller, which is not related to the invention, and thus related description is omitted.

On the other hand, when receiving an NRDY response from the endpoint 401-1, the control unit 301 sets the flag bit "fake release identification (DTRDY)" of the assigned buffer unit to "1"; that is the control unit 301 labels the assigned buffer unit as a fake releasing buffer unit rather than releasing the assigned buffer unit as prior art techniques. Moreover, the control unit 301 sets the flag bits "Device Address" and "Device Context Index (DCI)" of the assigned buffer unit as the device address of the USB device 400 which the endpoint 401 belongs to and the DCI of the endpoint 401-1, respectively. The flag bits "Device Address" and "Device Context Index (DCI)" form an identification indicating the endpoint 401-1, and the identification is related to the fake releasing buffer unit and the endpoint 401-1. The control unit 301 further ranks the buffer unit currently assigned to the endpoint 401-1 according to the sending sequence of the output signal on the basis of the sequence number of the buffer unit previously assigned to the endpoint 401-1. Accordingly, from the sequence number of the buffer unit previously assigned to the endpoint 401-1, the buffer unit currently assigned to the endpoint 401-1 is sorted by a following sequence number according to a low to high sequence. The sequence number is stored into the flag bit "Sequence Number (SEQ)" of the buffer unit currently assigned to the endpoint 401-1.

As described above, in the USB host controller according to the exemplary embodiment, when an NRDY response from one endpoint in the USB device is received, a fake releasing label and a tag which indicates the corresponding endpoint are configured in a buffer unit storing output data rather than the buffer unit is released as the prior art. Accordingly, when an ERDY request from the endpoint is received, the fake releasing buffer unit corresponding to the endpoint can be identified according to the tag, and the data stored in the identified buffer unit is sent to the endpoint without accessing the system memory. Thus, the frequency it takes for the USB host controller to respond to the ERDY request, and the times for accessing the system memory are reduced, thereby enhancing the performance of the USB host controller.

Figure 2A:
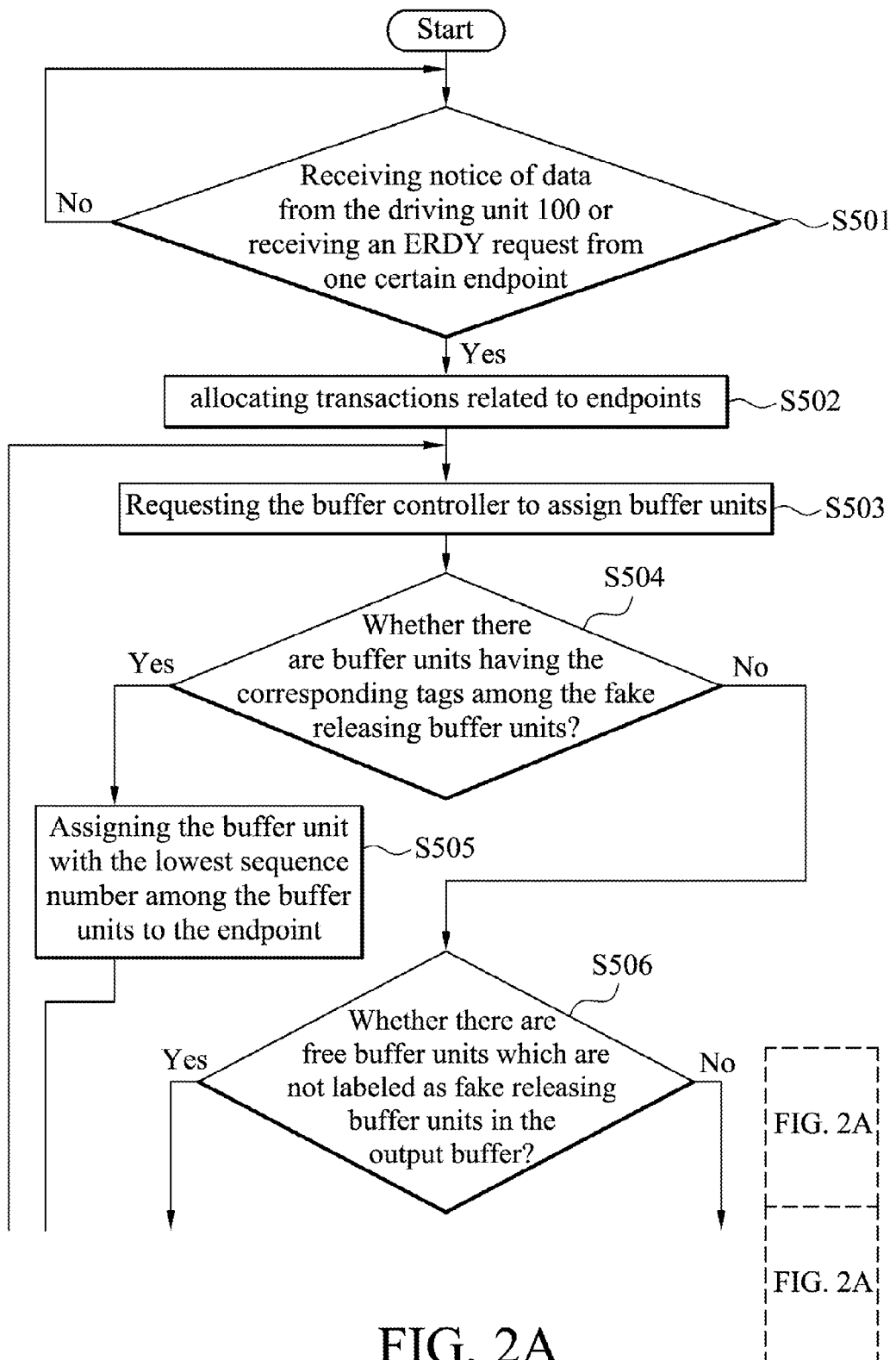
FIGS. 2A and 2B show a flow chart of an exemplary embodiment of a USB host control method.
Figure 2B:
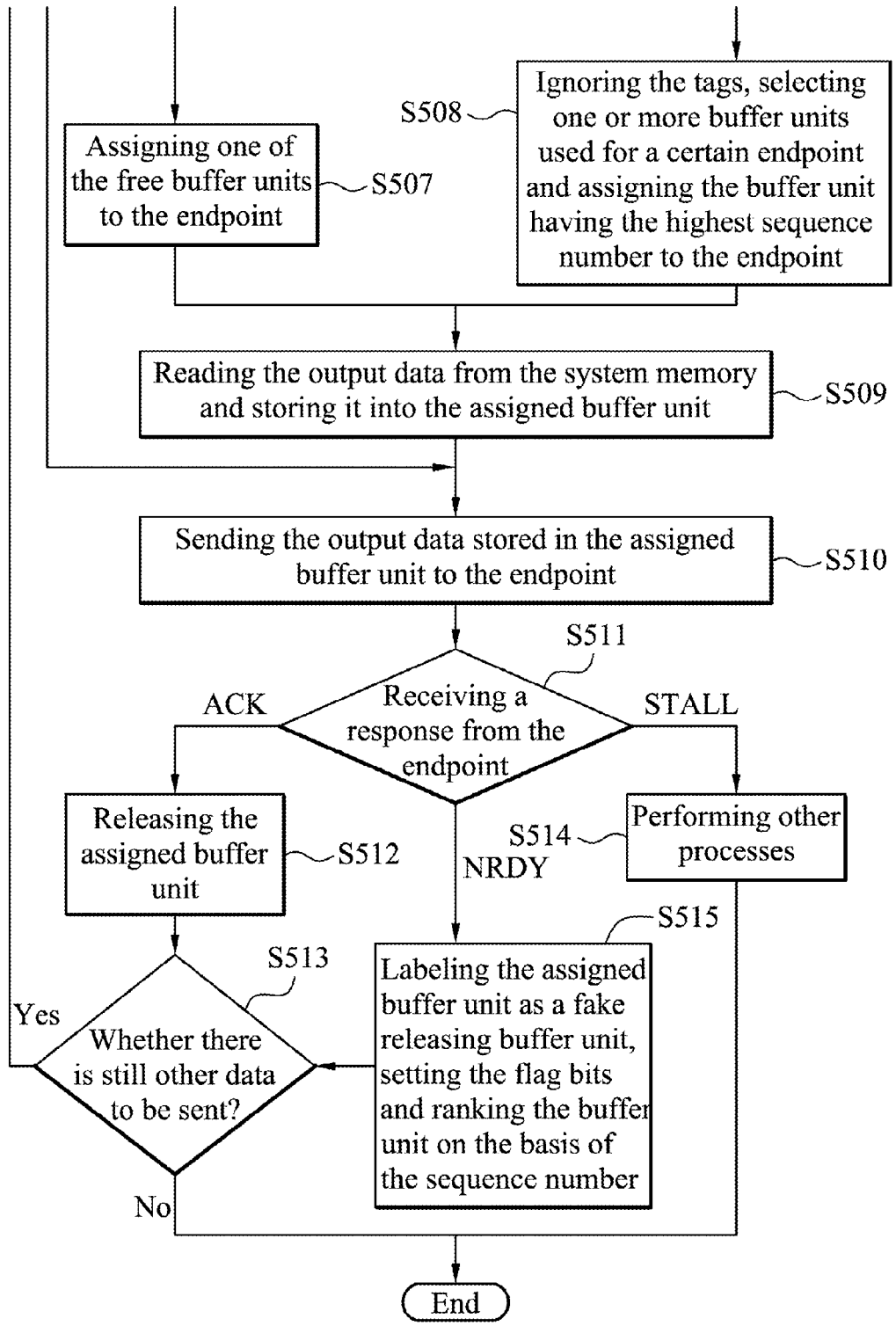

FIGS. 2A and 2B show a flow chart of an exemplary embodiment of a USB host control method.

As shown in FIG. 2A, in step S501, the control unit 301 determines whether the control unit 301 receives notice of data being sent to one certain endpoint from the driving unit 100 or an ERDY request from one certain endpoint. For description purposes, assume that the one certain endpoint is the endpoint 401-1. If the control unit 301 determines that it has not receive the notice or the ERDY request in step S501, the process of the USB host control method returns to step S501. On the contrary, if the control unit 301 determines that it has received the notice of data being sent to the endpoint 401-1 from the driving unit 100 or the ERDY request from the endpoint 401-1 in step S501, the process of the USB host control method proceeds to Step S502.

In step S502, the control unit 301 allocates transactions related to endpoints (including the transaction to the endpoint 401-1 and the transaction for the other endpoints) to determine the sequence of performing the transaction of the endpoint 401-1. The process of the USB host control method proceeds to Step S503.

When the allocating operation is coming, in step S503, the control unit 301 sends buffer unit assignation requests to the buffer unit controller 302 to request the buffer controller 302 to assign buffer units in the output buffer 303 to the endpoint 401-1. The process of the USB host control method proceeds to Step S504.

Then, in step S504, the buffer controller 302 determines whether there are buffer units having the tags corresponding to the endpoint 401-1 among the fake releasing buffer units in the output buffer 303. According to the description above, to perform the step S504, the buffer unit controller 302 can compare the device addresses and DCIs contained in the assignation requests, respectively, with the flag bits "Device Addresses" and "Device Context Index (DCI)" of the fake releasing buffer units.

If the buffer controller 302 determines that there are buffer units having the tag corresponding to the endpoint 401-1 in step S504, then in step S505, the buffer controller 302 assigns the buffer unit with the lowest sequence number among the buffer units to the endpoint 401-1. Then, the process of the USB host control method proceeds to step S510.

On the other hand, if the buffer controller 302 determines that there is no buffer unit having the tag corresponding to the endpoint 401-1 in step S504, the buffer controller 302 determines whether there are free buffer units which are not labeled as fake releasing buffer units in the output buffer 303 (that is the buffer units whose flag bits "Valid Bit (VALID)" are "1") in step S506. If there are free buffer units, the buffer controller 302 assigns one of the free buffer units to the endpoint 401-1 in step S507 (FIG. 2B). Moreover, the buffer controller 302 sets the flag bit "Valid Bit (VALID)" of the assigned buffer unit to "0" to indicate that the buffer unit has been assigned. On the contrary, if it is determined that there are no free buffer units in step S506, meaning that all the buffer units in the output buffer 303 are labeled as fake releasing buffer units and have the tags corresponding to other endpoints, in step S508, the buffer controller 302 ignores the tags configured in the fake releasing buffer units and selects one or more buffer units used for a certain endpoint among the fake releasing buffer units and assigns the buffer unit having the highest sequence number among the one or more buffer units to the endpoint 401-1. In this case, the control unit 301 modifies the flag bit "Fake Release Identification (DTRDY)" of the assigned buffer unit to "0" to cancel the fake release identification of the assigned buffer.

Then, in step S509, the control unit 301 reads the output data to be sent to the endpoint 401-1 from the system memory 200 and stores it into the buffer unit assigned in step S507 or S508. The process of the USB host control method proceeds to Step S510.

In step S510, the control unit 301 sends the output data stored in the assigned buffer unit to the endpoint 401-1. The process of the USB host control method proceeds to Step S511.

In step S511, the control unit 301 receives a response from the endpoint 401-1. Then, the control unit 301 performs different processes according to the different types of received responses.

Specifically, when receiving an acknowledgment (ACK) response, the control unit 301 releases the assigned buffer unit in step S512. Then, in step S513, the control unit 301 determines whether there is still other data to be sent. If there is still other data to be sent, the process of the USB host control method returns to step S503 and performs the above steps in turn. On the contrary, when there is no other data to be sent, the process of the USB host control method ends.

When receiving a stall (STALL) response in step S511, the control unit 301 performs other processes related to the stall response in step S514 and the process of the USB host control method ends. As with the previously stated reason, the description of the processes related to the stall response is omitted.

When receiving an NRDY response in step S511, in step S515, the control unit 301 sets the flag bit "fake release identification (DTRDY)" of the assigned buffer unit to "1" to label the assigned buffer unit as a fake releasing buffer unit. In step S515, the control unit 301 further configures the tag indicating the endpoint 401-1 sending the NRDY response; that is the control unit 301 sets the flag bits "Device Address" and "Device Context Index (DCI)" of the assigned buffer unit as the device address of the USB device 400 of the endpoint 401 and the DCI of the endpoint 401-1, respectively. Moreover, in step S515, the control unit 301 ranks the buffer unit assigned in step S507 or S508 according to the sending sequence of the output signal on the basis of the sequence number of the buffer unit previously assigned to the endpoint 401-1. Accordingly, from the sequence number of the buffer unit previously assigned to the endpoint 401-1, the buffer unit assigned in step S507 or S508 is signed by a following sequence number according to a low to high sequence. The sequence number is stored into the flag bit "Sequence Number (SEQ)" of the buffer unit. Then, the process of the USB host control method proceeds to step S513 and performs the above steps.

In the USB host control method, when an NRDY response from one endpoint is received, the buffer unit storing output data is labeled as a fake releasing buffer unit, but the buffer unit is not released. Accordingly, when an ERDY request from the same endpoint is received, the data stored in the buffer unit is directly sent to the endpoint without access to the system memory, thereby reducing the frequency it takes for the USB host controller to respond to the ERDY request, which enhances the performance of the USB host controller.

The USB host controller and the USB host control method has been described by way of example, it is to be understood that the invention is not limited to the disclosed embodiments. On the contrary, it is intended to cover various modifications. For example, in the above description, the tag configured in the buffer unit comprises "Device Address" and "Device Context Index (DCI)", however, the tag can further comprise other information for identifying the USB device and the endpoints. Moreover, in the case that the driving unit 100 informs the USB host controller 300 to send output data, after the step S503, the steps S504 and S505 can be skipped and step s506 can be directly performed.

Figure 3:
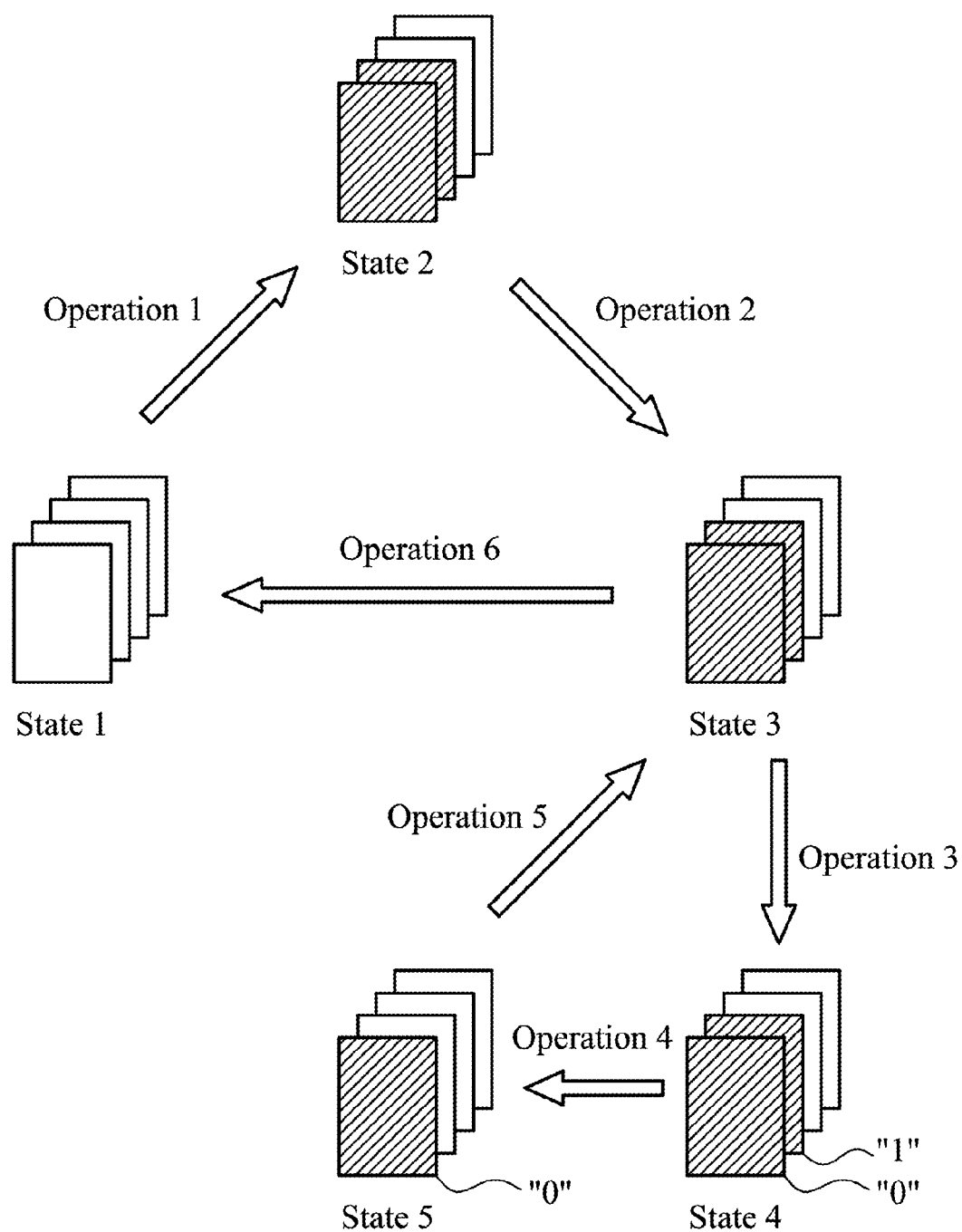
FIG. 3 shows the variation of the storage states of the output buffer and buffer units when the USB host control method according to the exemplary embodiment is performed.

In the following description, FIG. 3 shows the variation of the storage states of the output buffer and buffer units when the USB host control method according to the exemplary embodiment is performed for a specific situation.

As shown in FIG. 3, at the initial state 1, there is no buffer unit assigned to the endpoint 401-1 in the output buffer.

In the operation 1, the driving unit informs the USB host controller 300 to send data to the endpoint 401-1, and the buffer controller 302 assigns buffer units in the output buffer to the endpoint 401-1. Thus, at the state 2, some buffer units (represented by oblique lines) in the output buffer 303 are assigned to the endpoint 401-1.

In the operation 2, the control unit 301 reads the output data sent to the endpoint 401-1 from the system memory 200 and stores the output data into the assigned buffer units. At the state 3, the assigned buffer units (represented by shaded areas) store the output data.

In the operation 3, the control unit 301 sends data to the endpoint 401-1 and receives an NRDY response from the endpoint 401-1. Thus, the control unit 301 labels the assigned buffer units as fake releasing buffer units and sets corresponding tags and sequence of numbers in the assigned buffer units. At the state 4, the buffer units assigned to the endpoint 401-1 become fake releasing buffer units and have the sequence of numbers according to a low to high sequence (the sequence of numbers in FIG. 2 is "0" and "1").

In the operation 4, since there is a need to assign a buffer unit for another endpoint and there are no free buffer units in the output buffer 303, one of the buffer units used to the endpoint 401-1 is assigned for another endpoint. At this time, the buffer unit with the highest sequence number (the buffer unit with the sequence number "1") among the buffer units used for the endpoint 401-1 is assigned for another endpoint. Thus, at the state 5, only the buffer unit with the sequence number "0" is used for the endpoint 401-1.

In the operation 5, an ERDY request from the endpoint 401-1 is received. As previously described, the buffer controller 302 determines whether there are buffer units having tags corresponding to the endpoint 401-1 among the fake releasing buffer units in the output buffer 303 in advance. If there are the fake releasing buffer units having the tags corresponding to the endpoint 401-1, the data stored in the fake releasing buffer units is sent to the endpoint 401-1. Then, according to the requirements, the assignation of the buffer units in the output buffer 303 are re-performed, and the corresponding output data is read from the system memory 200 and stored into the assigned buffer units. At this time, the output buffer 303 returns to the state 3.

In the operation 6, the data stored in the buffer units is sent to the endpoint 401-1, an acknowledgment (ACK) response from the endpoint 401-1 is received, and the buffer units assigned to the endpoint 401-1 are released. At this time, the output buffer unit 303 returns to the state 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A universal serial bus (USB) host control method for a USB host controller, wherein the USB host controller communicates with a USB device and comprises a buffer, and the USB device comprises one or more endpoints, comprising:
   storing first output data to be sent to a first endpoint into one or more buffer units used for the first endpoint;
   sending the first output data to the first endpoint; and
   when a first predetermined response from the first endpoint is received, configuring a fake releasing label and an information tag corresponding to the first endpoint in the one buffer unit or each of the buffer units, and not releasing the one or more buffer units,
   when a notification indicating that second output data which is sent to a second endpoint has been received, assigning buffer units used for the second endpoint in the buffer, wherein step of assigning the buffer units used for the second endpoint in the buffer comprises:
   determining whether there are free buffer units in the buffer; and
   when there are no free buffer units, assigning one or more buffer units which are used for any other endpoints and comprise the fake releasing labels as the buffer units used for the second endpoint.

2. The USB host control method as claimed in claim 1, wherein when the first predetermined response from the first endpoint is received, the one or more buffer units are ranked according to a sending sequence of the first output data, and sequence of numbers are configured into the corresponding buffer units, wherein the sending sequence is the sequence that the USB host controller sends the first output data to the first endpoint.

3. The USB host control method as claimed in claim 1, wherein the buffer unit with the highest sequence number among the one or more buffer units which are used for any other endpoints and have the fake lease labels is assigned for the second endpoint.

4. The USB host control method as claimed in claim 1 further comprising:
   when a predetermined request from the first endpoint is received, determining whether there are buffer units having the information tags corresponding to the first endpoint among the buffer units in the buffer which have the fake releasing labels; and
   when there are buffer units having the information tags corresponding to the first endpoint, sending output data stored in the buffer units having the information tags corresponding to the first endpoint to the first endpoint.

5. The USB host control method as claimed in claim 4, wherein step of determining whether there are buffer units having the information tags corresponding to the first endpoint among the buffer units in the buffer which have the fake releasing labels comprises:
   comparing a device address of the USB device of the first endpoint and a device context index of the first endpoint in the predetermined request with the information tags of the buffer units having the fake releasing labels.

6. The USB host control method as claimed in claim 4, wherein the first predetermined response is an unready (NRDY) response, and the predetermined request is a ready (ERDY) request.

7. The USB host control method as claimed in claim 1 further comprising:
   when a second predetermined response from the first endpoint is received, releasing the one or more buffer units.

8. The USB host control method as claimed in claim 1, wherein the information tags corresponding to the first endpoint comprise a device address of the first endpoint and a device context index of the first endpoint.

9. The USB host control method as claimed in claim 1, wherein the step of assigning the buffer units used for the second endpoint in the buffer further comprises:
when there are free buffer units, the buffer units that will be used for the second endpoint are assigned from the free buffer units, wherein the free buffer units are buffer units which does not comprise the fake releasing labels.

10. The USB host control method as claimed in claim 1, wherein when there are no free buffer units, the data in one or more buffer units with the fake releasing labels and assigned for the second endpoint is overwritten.

11. A universal serial bus (USB) host controller communicating with a USB device which comprises one or more endpoints, comprising:
a buffer comprising one or more buffer units for storing output data to be sent to the one or more endpoints;
a control unit for controlling output transaction to the one or more endpoints, and
a buffer unit controller for assigning buffer units used for a second endpoint in the buffer when a notification indicating that second output data is sent to the second endpoint is received;
wherein the control unit sends the first output data to a first endpoint, and when a first predetermined response from the first endpoint is received, fake releasing labels and information tags corresponding to the first endpoint are configured in the buffer units storing the first output data of the first endpoint in the buffer, and the buffer units storing the first output data of the first endpoint are not released,
wherein the buffer unit controller assigns the buffer units used for the second endpoint by:
determining whether there are free buffer units in the buffer; and
when there are no free buffer units, assigning one or more buffer units which are used for any other endpoints and comprise the fake releasing labels as the buffer units used for the second endpoint.

12. The USB host controller as claimed in claim 11, wherein when the first predetermined response from the first endpoint is received, the control unit ranks the buffer units storing the first output data of the first endpoint according to a sending sequence of the first output data, and sequence of numbers are configured into the corresponding buffer units, wherein the sending sequence is the sequence that the USB host controller sends the first output data to the first endpoint.

13. The USB host controller as claimed in claim 11, wherein the buffer unit controller assigns the buffer unit with the highest sequence number among the one or more buffer units which are used for any other endpoints and have the fake lease labels for the second endpoint.

14. The USB host controller as claimed in claim 11,
wherein when a predetermined request from the first endpoint is received, the control unit determines whether there are buffer units having the information tags corresponding to the first endpoint among the buffer units in the buffer which have the fake releasing labels; and
wherein when there are buffer units having the information tag corresponding to the first endpoint, the control unit sends output data stored in the buffer units having the information tag corresponding to the first endpoint to the first endpoint.

15. The USB host controller as claimed in claim 14, wherein the control unit compares a device address of the USB device of the first endpoint and a device context index of the first endpoint in the predetermined request with the information tags of the buffer units having the fake releasing labels.

16. The USB host controller as claimed in claim 14, wherein the first predetermined response is an unready (NRDY) response, and the predetermined request is a ready (ERDY) request.

17. The USB host controller as claimed in claim 11, wherein when a second predetermined response from the first endpoint is received, the control unit releases the one or more buffer units.

18. The USB host controller as claimed in claim 11, wherein the information tags corresponding to the first endpoint comprise a device address of the first endpoint and a device context index of the first endpoint.

19. The USB host controller as claimed in claim 11, wherein the step of assigning the buffer units used for the second endpoint in the buffer further comprises:
when there are free buffer units, the buffer units that will be used for the second endpoint are assigned from the free buffer units, wherein the free buffer units are buffer units which does not comprise the fake releasing labels.

20. The USB host controller as claimed in claim 11, wherein when there are no free buffer units, the data in one or more buffer units with the fake releasing labels and assigned for the second endpoint is overwritten.

* * * * *